United States Patent Office 2,867,503
Patented Jan. 6, 1959

2,867,503

COBALT AND NICKEL RECOVERY USING CARBON DIOXIDE LEACH

Tuhin Kumar Roy, Elizabeth, N. J., assignor to Chemical Construction Corporation, New York, N. Y., a corporation of Delaware No Drawing. Application June 10, 1954
Serial No. 435,930

5 Claims. (Cl. 23—61)

This invention relates to the hydrometallurgical production of cobalt and nickel. More specifically, it relates to the chemical recovery and/or separation of cobalt and nickel values. Still more specifically, it relates to a process for recovering, separately if so desired, cobalt and nickel as carbonates from mixtures of compounds thereof and compounds of other metals, particularly iron and/or aluminum.

Unfortunately many natural deposits of cobalt and nickel, whether of oxide or sulfide minerals, contain other metals which are soluble to differing degrees in known methods of leaching. Particularly troublesome are iron and aluminum. Leach methods which are suitable for high rejection of such metals usually are characterized by slow action and by poor extraction of the metals of interest. On the other hand, methods which give good extraction in reasonable lengths of time usually result in dissolving an excessive amount of the extraneous metals content of the ore.

It is, therefore, a particular object of the present invention to develop a process whereby known methods of acidic, alkaline or ammonical leaching which permit high extraction of the cobalt or nickel may be combined with a novel method of concentrating the nickel and cobalt values. At the same time, the nickel and cobalt should be separated from the extraneous or unwanted metals and the process should be adapted to separate the nickel and cobalt from each other, if so desired.

In general, the invention is simply described. In a prior operation, the ore, or a concentrate thereof, will have been treated by some process, illustratively an acid leaching, which will give a suitable high extraction of the nickel and cobalt. The dissolved values are then concentrated by precipitation as an acid-soluble, alkaline mixture. Whether the liquor is still highly acidic, usually in free sulfuric acid, or has had its acid content partially reduced as with ammonia, this is simply done, as for example by treating the liquor with lime, limestone or an equivalent acid-neutralizing agent to produce a sufficiently high pH, at which the cobalt and nickel are precipitated as hydroxides or carbonates. Any precipitation of extraneous metals is allowed to occur fortuitously.

The specific process of this invention is then applied. Resultant precipitate is releached under suitable pressure with water in the presence of sufficient carbon dioxide. This results in rapid, effective extraction of the cobalt and nickel values and with sufficiently complete rejection of the co-precipitated unwanted metals. Resultant liquor under carbon dioxide is separated from residual solids and separated solution then treated by selective removal of carbon dioxide to produce either conjoint precipitation of nickel and cobalt or selective precipitation of first the nickel and then the cobalt.

It is particularly surprising that the step of high-pressure carbon dioxide leaching of the mixture is so thorough and selective. Ammonium-carbonate treatments, such as the Caron process of leaching of nickel-cobalt oxide ores, are well known. They are, unfortunately, very slow in operation and are characterized by poor recovery of the nickel. In fact, it is a surprising further virtue of the present process that it is applicable to tailings left after a leaching operation with leaching liquors of this type.

The process of the present nivention is, therefore, usually practiced on treated mixtures containing cobalt and nickel values along with other metal values as impurities. This merely means that an ore or a concentrate has been subjected to some known leaching operation prior to the practice of the present process. For example, the mixture to be treated may consist of an acid-soluble precipitate from an acidic leach liquor resulting from an acid leach of ores or concentrates containing cobalt and nickel; the acidic liquor being treated with lime to form the acid-soluble, cobalt- and nickel-containing alkaline precipitate. Alternatively, the treated mixture may consist of the acid-soluble content of residues resulting from an ammonical leaching of ores or concentrates. These latter residues, depending upon the leaching schedule, may contain from as low as 0.5% to as high as 25%, or higher, of the nickel originally present in the ore or concentrate and from as low as 5% to as high as 90% of the original cobalt. It can be seen, therefore, that when the process of the present invention is applied to the residue after an ammonical leach it improves the overall recovery of cobalt and nickel values present in the original ores or concentrates. Since the practice of the present invention is primarily advantageous in the treatment of acid-soluble, alkaline, solids mixtures precipitated from acidic liquors or the acid-soluble content of ammoniacal leach residues, the invention will be particularly described in its application thereto.

Dilute cobalt and/or nickel liquor resulting from an acidic leach in addition to the cobalt and nickel generally contains dissolved metals such as iron, aluminum, zinc, magnesium, and manganese. Sufficient lime, limestone, sodium carbonate or the like may be added to produce a basic pH and precipitate in a single operation both the iron and/or aluminum and also the nickel and cobalt. The subsequent carbon dioxide leaching step carried out in the present process on such precipitates or solids will take up the cobalt and nickel values selectively as soluble compounds, leaving iron and aluminum as insoluble compounds.

On the other hand, it is often desirable to separately remove the bulk of the metals before collecting the nickel and/or cobalt values. In the present process this is readily done. Ferric iron and/or aluminum, for example, may be selectively precipitated from an acidic leach liquor, for example, by liming the leach solution to an acidic pH of from about 3.5 to 4.0 on up to about 5.5–6. Treatment at a pH above about 5.0 is not preferred in this step as tending to permit nickel or cobalt to come down with the iron. The insoluble iron values in the form of hydroxides or a mixture of hydroxides and basic salts may be removed, as by decantation, filtration or the like. Additional acid-neutralizing agent, i. e., lime or a mixture of lime and limestone, or sodium carbonate, is then added to produce a basic pH in the range of from above about 7 to about 8.5. This neutralization precipitates cobalt and nickel values in the form of hydroxides or carbonates. Most of the magnesium, manganese and zinc remain in solution under these conditions. Precipitated cobalt and nickel values may then be separated from residual liquor in any desired manner as acid-soluble, alkaline solids mixtures for further treatment. It is at this point that the process of the present invention becomes particularly important.

An aqueous slurry is taken or prepared containing resultant acid-soluble, alkaline solids comprising nickel and/or cobalt compounds. It will include also the diluent compounds of the unwanted metals which are present in the precipitate. They will vary in amount depending upon whether the single step or multi-step precipitation operation was employed. In any case, such slurry is then treated with carbon dioxide at elevated pressure.

In the carbon dioxide treatment step, the gas is used up in dissolving nickel and/or cobalt. Although not necessarily resulting in solution thereof, it may also be taken up by various compounds of other metals which may be present. For this reason, it is desirable, even though not essential, that the solids comprising the cobalt and nickel compounds be as free as practicable from other compound which may take up carbon dioxide. Therefore, the procedure which produces the solids in this condition is preferable to the alternative of conjoint precipitation with iron and the like.

This carbon-dioxide treating step of the present process is preferably carried out in a stirred vessel in order to maintain adequate contact between the various reactants. A pressure of from about 50 to about 200 pounds per square inch gauge is preferred. Lower pressures may be used if necessary but the speed of reaction is too slow for general use. Similarly, higher pressures may be used if so desired but to do so will result in the necessity for heavier equipment without obtaining in most cases a sufficiently high gain in reaction speed to compensate for the added overhead.

It is preferred to carry out the carbon dioxide treating step at about ambient temperature. The reaction mixture may be cooled below the usual room temperature if so desired, but the rate of reaction is retarded as the temperature goes down. On the other hand, too high a temperature range will decrease the solubility of the carbon dioxide in water sufficiently to retard reaction speed. Therefore, it is desirable to utilize an economic balance between the two. A good operating practice is to use a temperature between about 15°–35° C., which will produce effective results in about one-half hour. Usually a temperature which requires over two hours of treating time will be considered as poor practice.

Since the solids content of the aqueous slurry during the carbon dioxide treating step is not highly critical, it is generally preferred to maintain the slurry at below about 50% solids content. A higher content ordinarily results in increased difficulty in materials handling. However, in optimum practice the solids content will vary somewhat with the metal content of the solids. It has been found in most cases that a slurry containing sufficient solids to produce, after leaching for the scheduled period, an exit liquor containing about ten grams per liter of dissolved cobalt plus nickel is the most convenient practice.

The carbon dioxide treating step results in the solubilization of the cobalt and nickel values. At the same time substantially all of the iron or aluminum present is left behind in insoluble form. Any magnesium, manganese or zinc which is with the hydroxide or carbonate precipitate, due to imperfect washing, remains in solution during the carbon dioxide treating step along with the so-dissolved cobalt and nickel values.

Pregnant liquor containing the dissolved cobalt and nickel is then separated from residual solids containing the undissolved iron and aluminum impurities. This step may be accomplished in any suitable apparatus by filtration or its mechanical equivalent. However, it is essential that the separating step be accomplished under pressure. If the pressure is relieved, a portion of the soluble cobalt and nickel values is likely to immediately precipitate as insoluble carbonates. Therefore, the preferred method of accomplishing the solids removal is by a pressure filtration. It is not essential that the filtration be conducted at as high a pressure as was used in the carbon dioxide treating step. It is essential that the pressure during filtration be sufficient to maintain the cobalt and nickel values in soluble condition. To some extent, then, the pressure will depend on the concentration of the nickel and cobalt in solution.

Once the insoluble iron has been separated from the solution of dissolved cobalt and nickel, the pressure may be released. Generally, this will result in an immediate precipitation of a portion of the cobalt and nickel values as carbonates.

Substantially complete precipitation of the cobalt and nickel values as carbonates is accomplished by removing the remaining carbon dioxide in any convenient manner. Steam stripping may be utilized, or the solution may be concentrated by evaporation, either at atmospheric or subatmospheric pressure. Once substantially all of the dissolved carbon dioxide has been removed from solution, substantially all of the nickel and cobalt in solution will precipitate as insoluble carbonates. If done in one step, the carbon dioxide removal will conjointly precipitate the nickel and cobalt. If so desired, it can be done in stages. If so, it will be found that nickel tends to precipitate first. Thus, if so desired, nickel and cobalt concentration with respect to the other may be carried out. At the same time, substantially all of the remaining magnesium, manganese and zinc will remain dissolved in the residual liquor. Thus a substantially complete separation of cobalt and nickel values from the various other metals associated therewith in the original ore is effected.

Resultant insoluble nickel and/or cobalt carbonates may be separated from residual liquor by filtration or dewatering or some equivalent operation. If so desired, a slurry resulting from a dewatering step or by repulping the carbonates in water may be treated with hydrogen at elevated temperatures and pressures, for example, 400°–450° F. and under some 400–500 p. s. i. g. hydrogen overpressure in order to reduce the cobalt and nickel values and produce a mixture of cobalt and nickel metal powder. The reduction generally is aided by the presence of a small concentration of $Co^{++}$ or $Ni^{++}$ or $H^+$ ions. These ions may be obtained by releaching with dilute aqueous sulfuric acid the last traces of the metals in the residue after the pressure filtration step. This also provides one method of recovering any residual small amounts of metal values in the residue after the treatment of the present process. Any acid solutions so obtained and not used for this purpose may be recycled to the feed.

Alternatively, the insoluble cobalt and/or nickel carbonates may be dissolved as with sulfuric acid and the solution treated if desired to preferentially reduce the nickel and then the cobalt. Such treatment eventually will yield substantially pure nickel metal powder substantially free of cobalt and substantially pure cobalt metal powder substantially free of nickel.

It is not known with certainty exactly which of the soluble cobalt and nickel compounds are formed during the carbon dioxide treating step. Possibly the soluble form of the two metals is that of bicarbonates. However, whatever the soluble compound, the two metals achieve a surprising degree of solubility under the conditions described in the carbon dioxide treating step and remain dissolved so long as the pressure is maintained in the presence of sufficient carbon dioxide. It is important that the necessary amount of carbon dioxide be available and that adequate pressure be maintained throughout the dissolving and solids-separation steps. It is convenient, but not necessary, to supply all the pressure by carbon dioxide overpressure in both steps.

As mentioned above, residues from ammoniacal leaching of sulfide or oxide ores or concentrates usually contain acid-soluble cobalt and nickel values. The process of the present invention may be directly practiced on such residues if so desired. For example, the residues are pulped in water and treated with carbon dioxide in accordance with the principles previously described. Such treatment will take up substantially all the remaining cobalt and nickel values from the leach residues and at the same time to a surprisingly effective degree will avoid dissolution of iron and/or aluminum and the problems resulting therefrom. Again, the carbon dioxide treating step puts the cobalt and nickel values into soluble form. After separating the solution containing soluble cobalt and nickel from any solid residues, including iron, the solution will be treated in accordance with the above described process to produce solid cobalt and/or nickel carbonates substantially free from iron and/or aluminum. This elimination of iron from the treating circuits by applying the process of the present invention to ammonia leach residues is therefore one of the advantages of the present process.

The present process, however, is somewhat selective in its precipitation of cobalt and nickel and, as noted above, may be so employed if so desired. However, it should be noted that the present proces is not necessarily intended to accomplish an enrichment of cobalt or nickel with respect to one another. Rather, the process is primarily directed at obtaining substantially all the cobalt and nickel values, from mixtures containing such values along with various other impurities, in a form sufficiently free from other soluble metal compounds to be suitable for feed to operations designed to produce elemental nickel and cobalt metal products.

An outstanding advantage of the present invention is that limestone is the only raw material needed. Roasting limestone produces the carbon dioxide to be utilized in the carbon dioxide treating step. Lime resulting from such roasting may be utilized to neutralize dilute leach liquors when the latter are treated by the present process. Another advantage is that the overall heat requirements of the present process are lower than for other known operations. Heat need only be applied in the carbon dioxide removing step and such heat is comparatively economically obtained by using steam.

The process of the present invention may be carried out batch-wise or continuously, whichever is convenient. In a continuous process it is necessary to insure that the residence time of the material to be treated in the carbon dioxide reactor be sufficient to solubilize the cobalt and nickel values.

The following examples are illustrative of the process of the present invention. Therein the indicated dissolved metal contents are given for the metal per se.

Example 1

A sample of an aqueous sulfuric acid solution containing 10 grams per liter of Co, 0.28 g./l. Ni, and 5 g./l. ferric iron was neutralized with lime to about pH=8. Resultant slurry was filtered and the solids residue repulped in water to about the original volume and pressurized with 50 p. s. i. g. $CO_2$ at room temperature in a stirred autoclave. After one hour a bomb sample was taken through a porous stainless steel filter. The solution was found to contain 7.4 g./l. Co, 0.3 g./l. Ni, and only 0.03 g./l. iron. The $CO_2$ pressure was then increased to 200 p. s. i. g. and another bomb filtrate sample taken. It contained in solution about 8.1 g./l. Co and 0.3 g./l. Ni. About one-half of the cobalt in solution immediately re-precipitated on releasing the $CO_2$ pressure. Cobalt and nickel were completely precipitated from the bomb filtrate by bubbling low pressure steam through the solution for one-half hour.

Example 2

A solution containing 9.6 g./l. Co and 0.3 g./l. Ni, as sulfates, was neutralized to a pH=7.5 with $Na_2CO_3$. The slurry was filtered and the residue repulped with about an equal volume of water and pressurized with $CO_2$ to 50 p. s. i. g. at room temperature. After about 30 minutes a bomb sample taken through a stainless steel porous filter showed a dissolved metal content of 8.9 g./l. Co, 0.26 g./l. Ni and only a trace of iron, showing that over 90% of the cobalt and nickel in the residue can be quickly dissolved in iron free condition with $CO_2$ in one step.

Example 3

A sample of Cuban laterite ore was roasted under reducing conditions at 500° C. and then leached with ammonia-ammonium carbonate solution resulting in a liquor containing about 70% of the nickel and 20% of the cobalt and leaving a washed residue assaying about 0.4% Ni and 0.12% Co. This wet residue was repulped to about 33% solids and autoclaved with $CO_2$ at 30° C. and 200 p. s. i. for 30 minutes and discharged through a pressure filter. One part of wash water per part of ore was then pumped through the cake. Resultant solution, amounting to 3 parts per part of ore, assayed 1 g./l. Ni and 0.3 g./l. Co and accounted for 75% of the nickel and 75% of the cobalt left undissolved by the initial leach.

I claim:

1. A process for selectively recovering at least one metal value selected from the group consisting of cobalt and nickel from a mixture of alkaline solids containing at least one acid-soluble compound of said metal value and of at least one diluent metal selected from the group consisting of iron and aluminum, which process consists essentially of: treating an aqueous slurry of said mixture and water with carbon dioxide gas at a temperature in the range of from about 15° to about 35° C., under superatmospheric pressures, whereby at least a part of said metal value is selectively dissolved from said mixture; maintaining said pressure with carbon dioxide until said metal value is substantially completely dissolved; then while maintaining resultant slurry under at least sufficient pressure to prevent precipitation of said dissolved metal value, separating resultant solution from residual undissolved solids; then at least partially pressure-relieving the resultant separated solution, whereby carbon dioxide is released from the pressure-relieved solution and a precipitate is obtained in which the mol ratio of metal values to diluent metal is increased over that in said mixture; removing released carbon dioxide and collecting said precipitate.

2. A process according to claim 1 in which said elevated pressure is in the range of about 50–200 pounds per square inch gauge.

3. A process according to claim 1 in which said step of removing carbon dioxide from said solution is accomplished by steam stripping.

4. A process according to claim 1 in which said alkaline solids mixture comprises a mixed solids precipitate obtained by leaching a mineral material containing said metal with an aqueous leaching acid; separating resultant leach liquor from undissolved solids and treating the separated liquor to produce therein an alkaline pH.

5. A process according to claim 1 in which said alkaline solids mixtures comprises an undissolved solid residue obtained by subjecting a mineral material containing said metal value to leaching with an ammoniacal leach liquor and separating resultant solution from the undissolved solids.

References Cited in the file of this patent

UNITED STATES PATENTS

| | | |
|---|---|---|
| 330,454 | Aaron | Nov. 17, 1885 |
| 1,204,843 | Bretherton | Nov. 14, 1916 |
| 2,290,313 | Caron | July 21, 1942 |
| 2,367,239 | Renzoni | Jan. 16, 1945 |
| 2,509,918 | Griffith | May 30, 1950 |
| 2,711,957 | Schaufelberger | June 28, 1955 |